(12) United States Patent
Hu et al.

(10) Patent No.: US 12,663,335 B2
(45) Date of Patent: Jun. 23, 2026

(54) METHOD FOR MEASURING PARAMETERS OF ROADWAY LOW-POSITION LIGHTING FIXTURES

(71) Applicant: BEIJING UNIVERSITY OF TECHNOLOGY, Beijing (CN)

(72) Inventors: Jiangbi Hu, Beijing (CN); Yunpeng Guo, Beijing (CN); Xiaojuan Gao, Beijing (CN); Ronghua Wang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 596 days.

(21) Appl. No.: 18/028,540

(22) PCT Filed: Sep. 16, 2021

(86) PCT No.: PCT/CN2021/118727
§ 371 (c)(1),
(2) Date: Mar. 25, 2023

(87) PCT Pub. No.: WO2022/063017
PCT Pub. Date: Mar. 31, 2022

(65) Prior Publication Data
US 2023/0358634 A1 Nov. 9, 2023

(30) Foreign Application Priority Data
Sep. 25, 2020 (CN) .......................... 202011020934.3

(51) Int. Cl.
G01M 11/02 (2006.01)
H05B 45/10 (2020.01)
H05B 45/20 (2020.01)

(52) U.S. Cl.
CPC ......... G01M 11/0207 (2013.01); H05B 45/10 (2020.01); H05B 45/20 (2020.01)

(58) Field of Classification Search
CPC ...... F21S 2/00; F21S 8/081; F21W 2131/101; F21W 2131/103; G01J 5/605;
(Continued)

(56) References Cited

U.S. PATENT DOCUMENTS

2017/0313237 A1 11/2017 Hu et al.
2018/0307918 A1* 10/2018 Hu .......................... H05B 47/11
2024/0357722 A1* 10/2024 Lang .................... H05B 47/105

FOREIGN PATENT DOCUMENTS

CN 204187399 U 3/2015
CN 104533441 A 4/2015
(Continued)

*Primary Examiner* — Raymond R Chai
(74) *Attorney, Agent, or Firm* — S.J. INTELLECTUAL PROPERTY LTD.

(57) ABSTRACT

An installation method for roadway low-position lighting fixtures uses parameter measurement from a dynamic visual recognition experiment. Multiple fixture sets having respective preset color temperature and color rendering index pairs, or a configurable fixture set providing multiple such pairs, are tested at predetermined luminance levels and operating speeds on a dynamic experimental road with a randomly placed target. A test vehicle includes a speed detection device, and a tested driver wears an eye-tracker. Based on eye movement indicating target recognition, an operator marks a vehicle position at recognition and a vehicle position at passing the target to obtain a recognition distance. Samples of luminance and recognition distance are collected across luminance levels, speeds, lighting environments, and drivers. A recognition-distance-luminance model is fitted to derive a luminance threshold meeting a safe sight distance requirement, and fixtures are selected and installed along both sides of the road accordingly.

15 Claims, 6 Drawing Sheets

(a) Elevation View  (b) Top View (a) Elevation View (b) Top View

(58) Field of Classification Search
CPC ............. G01M 11/02; G01M 11/0207; G01M
11/0214; H05B 45/10; H05B 45/20;
H05B 47/105; Y02B 20/40
See application file for complete search history.

(56) References Cited

FOREIGN PATENT DOCUMENTS

| | | |
|---|---|---|
| CN | 205592812 U | 9/2016 |
| CN | 112179625 A | 1/2021 |
| JP | 2017107668 A | 6/2017 |

* cited by examiner

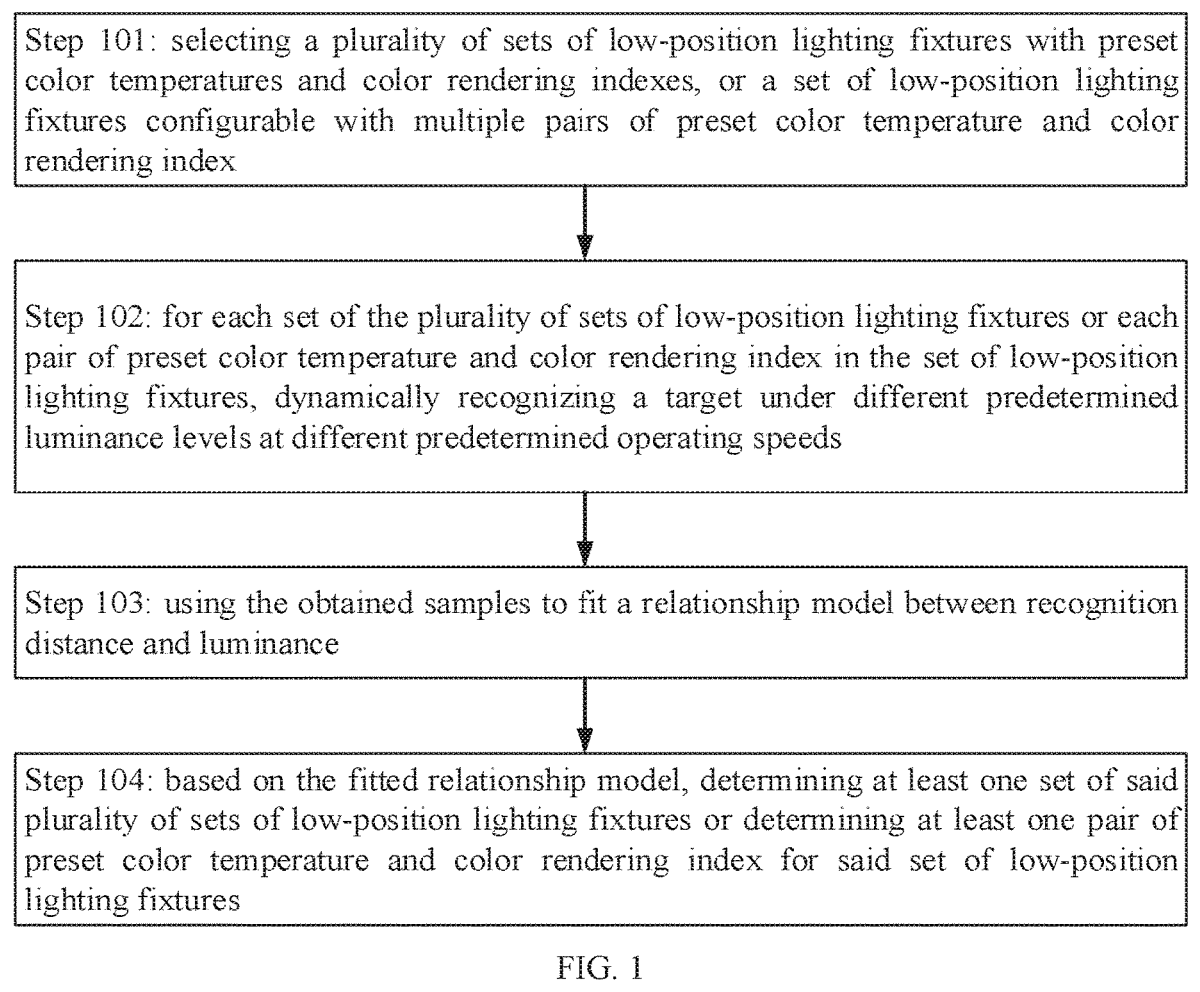

Step 101: selecting a plurality of sets of low-position lighting fixtures with preset color temperatures and color rendering indexes, or a set of low-position lighting fixtures configurable with multiple pairs of preset color temperature and color rendering index

↓

Step 102: for each set of the plurality of sets of low-position lighting fixtures or each pair of preset color temperature and color rendering index in the set of low-position lighting fixtures, dynamically recognizing a target under different predetermined luminance levels at different predetermined operating speeds

↓

Step 103: using the obtained samples to fit a relationship model between recognition distance and luminance

↓

Step 104: based on the fitted relationship model, determining at least one set of said plurality of sets of low-position lighting fixtures or determining at least one pair of preset color temperature and color rendering index for said set of low-position lighting fixtures

FIG. 1

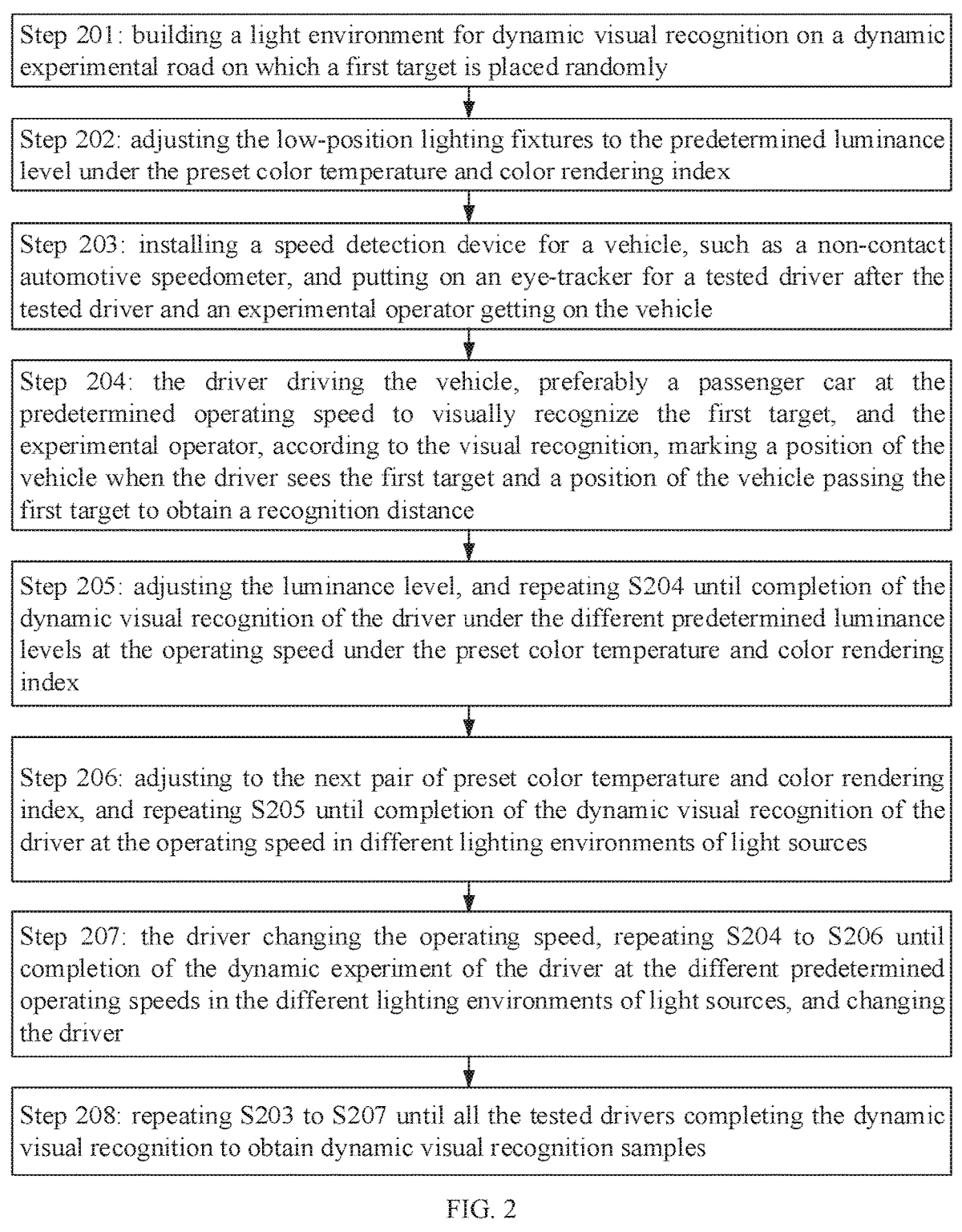

Step 201: building a light environment for dynamic visual recognition on a dynamic experimental road on which a first target is placed randomly $\downarrow$ Step 202: adjusting the low-position lighting fixtures to the predetermined luminance level under the preset color temperature and color rendering index $\downarrow$ Step 203: installing a speed detection device for a vehicle, such as a non-contact automotive speedometer, and putting on an eye-tracker for a tested driver after the tested driver and an experimental operator getting on the vehicle $\downarrow$ Step 204: the driver driving the vehicle, preferably a passenger car at the predetermined operating speed to visually recognize the first target, and the experimental operator, according to the visual recognition, marking a position of the vehicle when the driver sees the first target and a position of the vehicle passing the first target to obtain a recognition distance $\downarrow$ Step 205: adjusting the luminance level, and repeating S204 until completion of the dynamic visual recognition of the driver under the different predetermined luminance levels at the operating speed under the preset color temperature and color rendering index $\downarrow$ Step 206: adjusting to the next pair of preset color temperature and color rendering index, and repeating S205 until completion of the dynamic visual recognition of the driver at the operating speed in different lighting environments of light sources $\downarrow$ Step 207: the driver changing the operating speed, repeating S204 to S206 until completion of the dynamic experiment of the driver at the different predetermined operating speeds in the different lighting environments of light sources, and changing the driver $\downarrow$ Step 208: repeating S203 to S207 until all the tested drivers completing the dynamic visual recognition to obtain dynamic visual recognition samples

FIG. 2

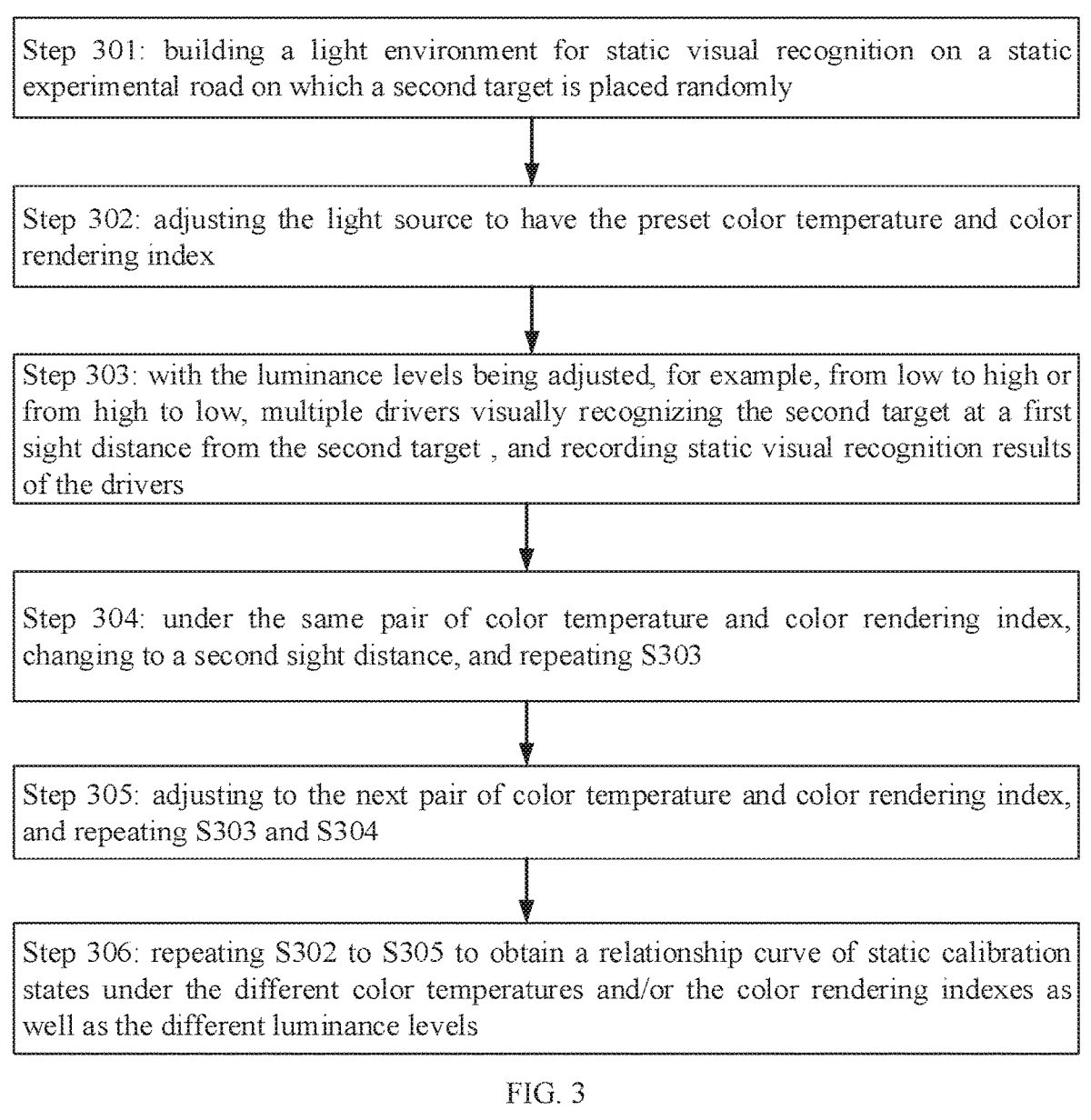

Step 301: building a light environment for static visual recognition on a static experimental road on which a second target is placed randomly Step 302: adjusting the light source to have the preset color temperature and color rendering index Step 303: with the luminance levels being adjusted, for example, from low to high or from high to low, multiple drivers visually recognizing the second target at a first sight distance from the second target , and recording static visual recognition results of the drivers Step 304: under the same pair of color temperature and color rendering index, changing to a second sight distance, and repeating S303

Step 305: adjusting to the next pair of color temperature and color rendering index, and repeating S303 and S304

Step 306: repeating S302 to S305 to obtain a relationship curve of static calibration states under the different color temperatures and/or the color rendering indexes as well as the different luminance levels

FIG. 3

Step 401: selecting the low-position lighting fixtures or the preset color temperatures and color rendering indexes of the low-position lighting fixtures which meet the driver's safe visual recognition requirements Step 402: determining energy consumption of the low-position lighting fixtures or the preset color temperatures and color rendering indexes of the low-position lighting fixtures which meet the driver's safe visual recognition requirements under a road-installed state Step 403: determining the at least one set or the at least one pair of preset color temperature and color rendering index with minimum energy consumption

FIG. 4

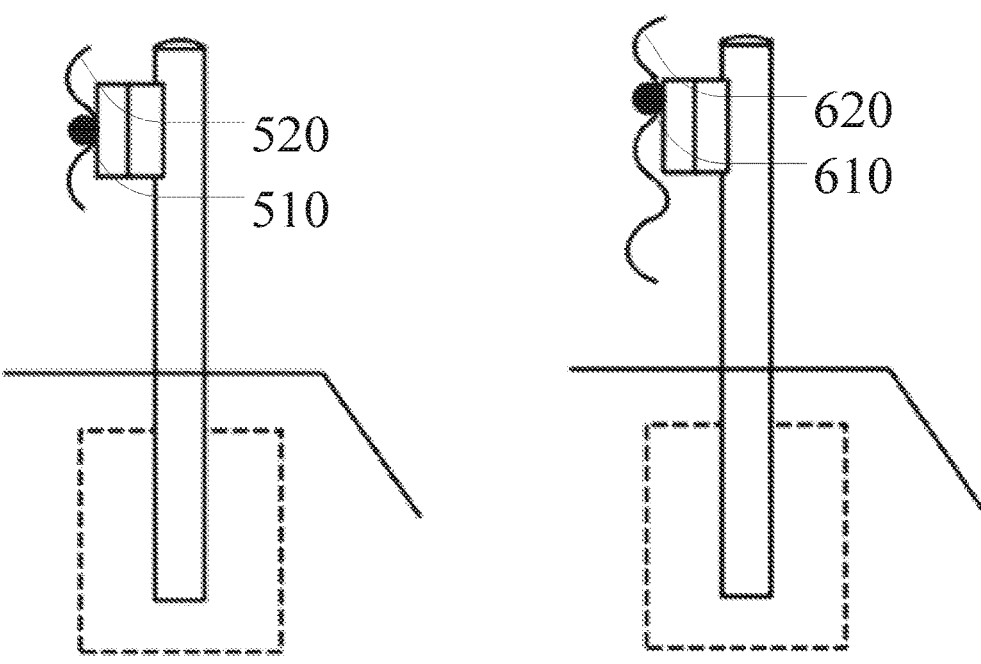

FIG. 5                              FIG. 6

(a) Elevation View                    (b) Top View (a) Elevation View                    (b) Top View

METHOD FOR MEASURING PARAMETERS OF ROADWAY LOW-POSITION LIGHTING FIXTURES

The present disclosure claims benefit of or priority to Chinese Patent Application No. 202011020934.3 filed on Sep. 25, 2020, the entire contents of which are incorporated herein by reference.

TECHNICAL FIELD

The application relates to the technical field of roadway lighting, and in particular to, a method for measuring parameters of roadway low-position lighting fixtures and an installation method of roadway low-position lighting fixtures. In addition, the application also relates to a road on which low-position lighting fixtures are installed using the installation method.

BACKGROUND

The purpose of road lighting is to create a well-lit environment for safe nighttime road operation, which allows drivers to quickly obtain important information regarding driving safety from the traffic environment and avoid accidents caused by poor visibility.

Currently, the lighting of the viaduct, bridge-tunnel connection section, tunnel approaches of entrances and exits, self-rescue ramps, etc. in the road system is typically achieved by installing one or multiple high-power lighting sources on poles which are 10 to 15 meters high. However, the lighting method has the following technical drawbacks: 1) high cost; 2) serious light pollution; 3) low utilization rate of light; and 4) difficulty in maintenance.

To address the above drawbacks, the technology of low-position lighting is proposed in the art either at home or abroad. However, there are still some traffic safety risks associated with the design of low-position lighting, including: 1) Light source characteristic indicators: the design of low-position lighting fixture mainly considers luminance and uniformity, but lacks consideration of light source characteristic indicators; and the design standards of low-position lighting fixtures are mechanically applied to almost all roadways without adapting to the special features of the road; 2) Installation height: The installation height is too high, causing the light emitted by the lighting fixtures to overlap with the driver's field of vision, resulting in glare during driving; 3) Lighting distribution: The commonly used light distribution pattern is to illuminate the road surface vertically, which will cause uneven luminance level of the road surface on the left and right parts of the road with dark spots. Meanwhile, due to the intersection of the lights and the driver's field of vision, the glare issues cannot be avoided. These issues make it difficult for low-position lighting fixtures to effectively meet the driver's visual recognition needs for safe nighttime driving, which reduces the safety service level of nighttime road operations.

Chinese patent CN205592812U discloses parameters such as the color temperature, installation height and longitudinal installation distance of the low-position lighting fixtures, but fails to provide a reasonable method for determining the technical parameters of the low-position lighting fixtures. This may pose a safety hazard for nighttime driving when using the low-position lighting fixtures. To meet the visual recognition needs of drivers during nighttime driving, a method for measuring technical parameters of low-position lighting fixtures needs to be developed, so as to provide support for the adaptive configuration and installation of the low-position lighting fixtures on different types of roads.

The content described in the background is only for the purpose of understanding the relevant technology in the field, and should not be interpreted as an admission to the prior art.

SUMMARY OF THE INVENTION

In embodiments of the present invention, accordingly, it is intended to provide a method for measuring parameters of roadway low-position lighting fixtures, which parameters the requirements of safe visual recognition for drivers, addressing the problems in the light source characteristic indicators, installation height, and lighting distribution in the existing low-level lighting design.

In embodiments of the present invention, provided is a method for measuring parameters of roadway low-position lighting fixtures, comprising:

S101: selecting a plurality of sets of low-position lighting fixtures with preset color temperatures and color rendering indexes, or a set of low-position lighting fixtures configurable with multiple pairs of preset color temperature and color rendering index;

S102: for each set of the plurality of sets of low-position lighting fixtures or each pair of preset color temperature and color rendering index in the set of low-position lighting fixtures, dynamically recognizing a target under different predetermined luminance levels at different predetermined operating speeds, the step S102 further including the following sub-steps of:

S201: building a light environment for dynamic visual recognition on a dynamic experimental road on which a first target is placed randomly;

S202: adjusting the low-position lighting fixtures to the predetermined luminance level under the preset color temperature and color rendering index;

S203: installing a speed detection device for a vehicle, such as a non-contact automotive speedometer, and putting on an eye-tracker for a tested driver after the tested driver and an experimental operator getting on the vehicle;

S204: the driver driving the vehicle, preferably a passenger car at the predetermined operating speed to visually recognize the first target, and the experimental operator, according to the visual recognition, marking a position of the vehicle when the driver sees the first target and a position of the vehicle passing the first target to obtain a recognition distance;

S205: adjusting the luminance level, and repeating S204 until completion of the dynamic visual recognition of the driver under the different predetermined luminance levels at the operating speed under the preset color temperature and color rendering index;

S206: adjusting to the next pair of preset color temperature and color rendering index, and repeating S205 until completion of the dynamic visual recognition of the driver at the operating speed in different lighting environments of light sources;

S207: the driver changing the operating speed, repeating S204 to S206 until completion of the dynamic experiment of the driver at the different predetermined operating speeds in the different lighting environments of light sources, and changing the driver; and S208: repeating S203 to S207 until all the tested drivers completing the dynamic visual recognition to obtain dynamic visual recognition samples;

S103: using the obtained samples to fit a relationship model between recognition distance and luminance; and S104: based on the fitted relationship model, determining at least one set of said plurality of sets of low-position lighting fixtures or determining at least one pair of preset color temperature and color rendering index for said set of low-position lighting fixtures.

With the dynamic visual recognition and fitting described in the embodiments of the present invention, it is highly beneficial to overcome the problems existing in the light source characteristic indicators, installation height and light distribution in the design of the current low-position lighting fixtures. It is particularly advantageous that in the embodiments of the present invention the relevant parameters may be adaptively configured with respect to different roads or different sections of the road.

In some embodiments, the S101 comprises a static visual recognition of light source characteristic indicators, comprising:

S301: building a light environment for static visual recognition on a static experimental road on which a second target is placed randomly;

S302: adjusting the light source to have the preset color temperature and color rendering index;

S303: with the luminance levels being adjusted, for example, from low to high or from high to low, multiple drivers visually recognizing the second target at a first sight distance from the second target, and recording static visual recognition results of the drivers;

S304: under the same pair of color temperature and color rendering index, changing to a second sight distance, and repeating S303;

S305: adjusting to the next pair of color temperature and color rendering index, and repeating S303 and S304; and S306: repeating S302 to S305 to obtain a relationship curve of static calibration states under the different color temperatures and/or the color rendering indexes as well as the different luminance levels.

Optionally, the step S101 comprises pre-verifying the preset color temperatures and color rendering indexes based on the relationship curve of the static calibration state.

With the static visual recognition of the embodiments of the present invention, it is further beneficial to overcome the problems existing in the light source characteristic indicators, installation height and light distribution in the design of the existing low-position lighting fixtures.

In some embodiments, the S103 comprises:

a) for the sight distances and the respective luminance levels of the samples obtained under the same pair of color temperature and color rendering index, fitting the recognition distances and the respective luminance levels of the samples using a Sigmoid function model.

In some embodiments, the S104 comprises:

b) determining the at least one set or the at least one pair of preset color temperature and color rendering index which meet driver's safe visual recognition requirements.

In some embodiments, the step b) comprises:

S401: selecting the low-position lighting fixtures or the preset color temperatures and color rendering indexes of the low-position lighting fixtures which meet the driver's safe visual recognition requirements;

S402: determining energy consumption of the low-position lighting fixtures or the preset color temperatures and color rendering indexes of the low-position lighting fixtures which meet the driver's safe visual recognition requirements under a road-installed state;

S403: determining the at least one set or the at least one pair of preset color temperature and color rendering index with minimum energy consumption.

The embodiment brings in particularly advantageous effects, such as the ability to select parameters that not only meet the driver's visual recognition requirements but also achieve better environmental protection for different roads.

In embodiments of the present invention, provided is installation method of roadway low-position lighting fixtures, comprising:

selecting a plurality of low-position lighting fixtures determined by the measuring method according to any embodiment of the present invention; and installing the plurality of low-position lighting fixtures along both sides of a road.

In some embodiments, the installing the plurality of low-position lighting fixtures along both sides of a road, comprises:

installing double-beam barrier or three-beam barrier along both sides of the road; and arranging the plurality of low-position lighting fixtures at intervals in a groove of the double-beam barrier or in an upper groove of the three-beam barrier in a road direction.

Preferably, the installation height of the low-position lighting fixtures is in the range of 55 to 85 cm.

Preferably, the installation height of the low-position lighting fixtures is 60 cm or 80 cm.

More preferably, for the double-beam barrier, the installation height of the low-position lighting fixtures is 60 cm and for the three-beam barrier, the installation height of the low-position lighting fixtures is 80 cm.

In some embodiments, the installing the plurality of low-position lighting fixtures along both sides of a road, comprises:

installing the plurality of low-position lighting fixtures to illuminate in a vehicle traveling direction in a manner that a peak line of light source is coincident with a center line of a driving lane of the road.

Preferably, a horizontal projection angle of the low-position lighting fixtures on a left side of the road is in a range of 40° to 45°, preferably 42.15°, and a vertical projection angle is in a range of 26°~31°, preferably 28.54°.

Preferably, a horizontal projection angle of the low-position lighting fixtures on a right side of the road is in a range of is 26°~31°, preferably 28.54°, and a vertical projection angle is in a range of 27°~32°, preferably 29.24°.

In some embodiments, the installing the plurality of low-position lighting fixtures along both sides of a road, comprises:

for a straight-line section of the road, installing the plurality of low-position lighting fixtures at a fixed installation height in a vehicle traveling direction; and for a slope section of the road, installing the plurality of low-position lighting fixtures with gradually changing installation heights.

This may provide an improved driving experience for drivers.

In embodiments of the present invention, provided is a road, comprising a plurality of low-position lighting fixtures installed by the installation method of roadway low-position lighting fixtures according to any embodiment of the present invention.

Optional features and other effects of the embodiments of the present invention are partially described below, while the rest will be understandable after reading the disclosure.

BRIEF DESCRIPTION OF DRAWINGS

The embodiments of the present invention will be described below in details with reference to the accompanying drawings, in which the elements as shown are not limited by the scale shown in the drawings and the same or similar reference numerals in the drawings denote the same or similar elements, wherein:

FIG. 1 shows a first exemplary flowchart of a measuring method according to an embodiment of the present invention;

FIG. 2 shows a second exemplary flowchart of the measuring method according to an embodiment of the present invention;

FIG. 3 shows a third exemplary flowchart of the measuring method according to an embodiment of the present invention;

FIG. 4 shows a fourth exemplary flowchart of the measuring method according to an embodiment of the present invention;

FIG. 5 is a first diagram of a roadway installation method according to an example of the present invention for the installation of low-position lighting fixtures in a double-beam barrier;

FIG. 6 is a second diagram of a roadway installation method according to an example of the present invention, showing the installation of low-position lighting fixtures in a three-beam barrier;

DETAILED DESCRIPTION OF SPECIFIC EMBODIMENTS

Figures 7, 8:
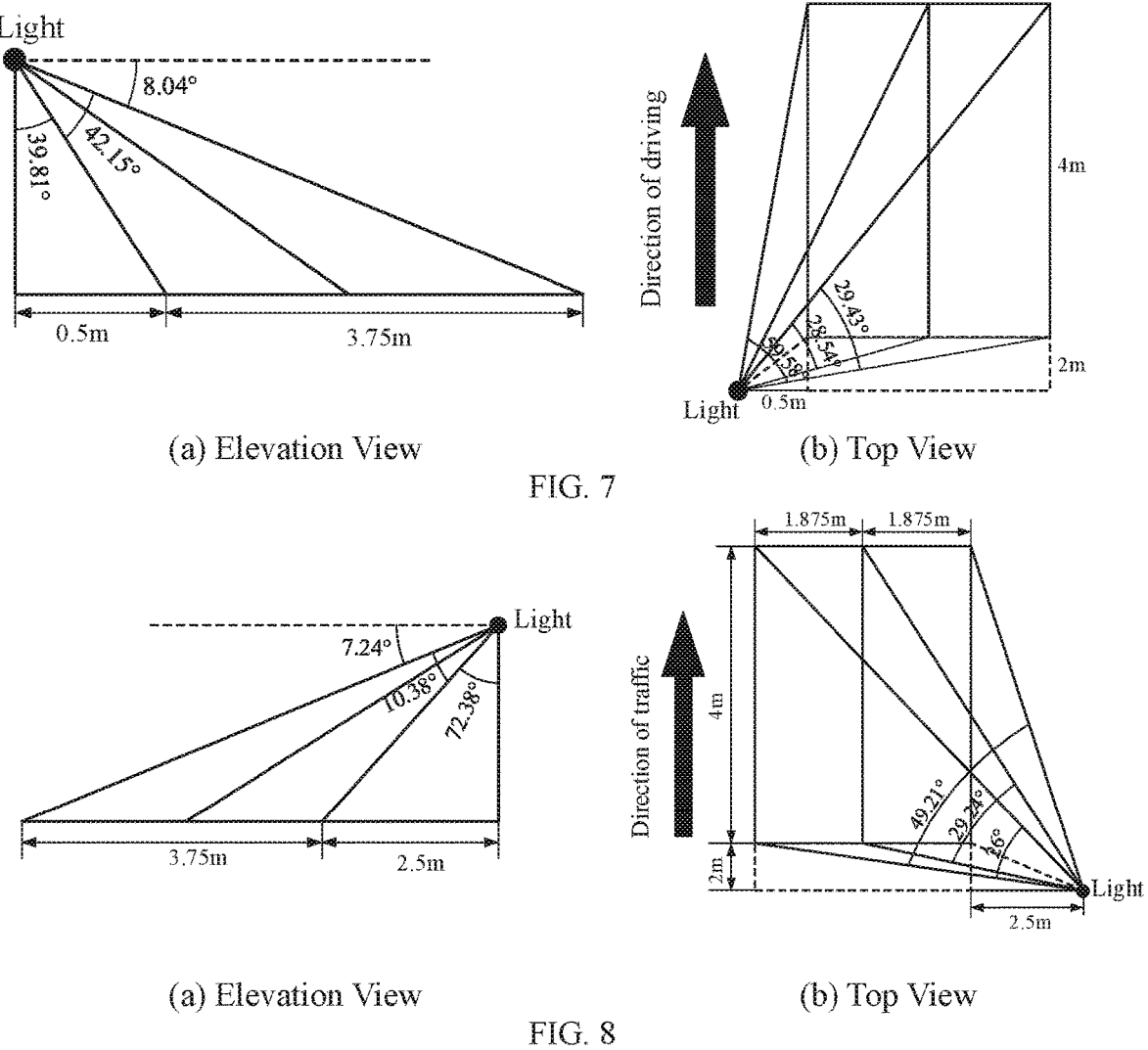
FIG. 7 is a third diagram of a roadway installation method according to an example of the present invention for the installation of low-position lighting fixtures in a left-side barrier.
FIG. 8 is the third diagram of the road installation method according to the example of the present invention for the installation of low-position lighting fixtures in a right-side barrier.

In order to make the objectives, technical solutions and advantages of the present invention more apparent, the present invention will be further described in detail below with reference to the specific embodiments and accompanying drawings. The exemplary embodiments of the present invention and their descriptions are as explanations instead of limitation to the present invention.

In FIG. 1, a method for measuring parameters of roadway low-position lighting fixtures according to embodiments of the present invention is shown. The method comprises the following steps S101 to S104.

S101: Selecting a plurality of sets of low-position lighting fixtures with preset color temperatures and color rendering indexes, or a set of low-position lighting fixtures configurable with multiple pairs of preset color temperature and color rendering index.

S102: For each set of the plurality of sets of low-position lighting fixtures or each pair of preset color temperature and color rendering index in the set of low-position lighting fixtures, dynamically recognizing a target under different predetermined luminance levels at different predetermined operating speeds.

As shown in FIG. 2, in embodiments of the present invention, the step S102 comprises the following sub-steps S201 to S208.

S201: building a light environment for dynamic visual recognition on a dynamic experimental road on which a first target is placed randomly;

S202: adjusting the low-position lighting fixtures to the predetermined luminance level under the preset color temperature and color rendering index;

S203: installing a speed detection device for a vehicle, such as a non-contact automotive speedometer, and putting on an eye-tracker for a tested driver after the tested driver and an experimental operator getting on the vehicle;

S204: the driver driving the vehicle, preferably a passenger car at the predetermined operating speed to visually recognize the first target, and the experimental operator, according to the visual recognition, marking a position of the vehicle when the driver sees the first target and a position of the vehicle passing the first target to obtain a recognition distance;

S205: adjusting the luminance level, and repeating S204 until completion of the dynamic visual recognition of the driver under the different predetermined luminance levels at the operating speed under the preset color temperature and color rendering index;

S206: adjusting to the next pair of preset color temperature and color rendering index, and repeating S205 until completion of the dynamic visual recognition of the driver at the operating speed in different lighting environments of light sources;

S207: the driver changing the operating speed, repeating S204 to S206 until completion of the dynamic experiment of the driver at the different predetermined operating speeds in the different lighting environments of light sources, and changing the driver; and S208: repeating S203 to S207 until all the tested drivers completing the dynamic visual recognition to obtain dynamic visual recognition samples.

S103: Using the obtained samples to fit a relationship model between recognition distance (D) and luminance (L).

In some embodiments of the present invention, the step S103 comprises:

a) for the sight distances (D) and the respective luminance levels (L) of the samples obtained under the same pair of color temperature and color rendering index, fitting the recognition distances (D) and the respective luminance levels (L) of the samples using a Sigmoid function model.

S104: Based on the fitted relationship model, determining at least one set of said plurality of sets of low-position lighting fixtures or determining at least one pair of preset color temperature and color rendering index for said set of low-position lighting fixtures.

In some embodiments of the present invention, the step S104 comprises:

b) determining the at least one set or the at least one pair of preset color temperature and color rendering index which meet driver's safe visual recognition requirements.

In an embodiment of the present invention, as shown in FIG. 4, the step b) comprises:

S401: selecting the low-position lighting fixtures or the preset color temperatures and color rendering indexes of the low-position lighting fixtures which meet the driver's safe visual recognition requirements;

S402: determining energy consumption of the low-position lighting fixtures or the preset color temperatures and color rendering indexes of the low-position lighting fixtures which meet the driver's safe visual recognition requirements under a road-installed state;

S403: determining the at least one set or the at least one pair of preset color temperature and color rendering index with minimum energy consumption.

In embodiments of the present invention, the step S101 comprises a static visual recognition of light source characteristic indicators.

As shown in FIG. 3, in an embodiment of the present invention, the step S101 comprises steps S301 to S306.

S301: building a light environment for static visual recognition on a static experimental road on which a second target is placed randomly;

S302: adjusting the light source to have the preset color temperature and color rendering index;

S303: with the luminance levels being adjusted, for example, from low to high or from high to low, multiple drivers visually recognizing the second target at a first sight distance from the second target, and recording static visual recognition results of the drivers;

S304: under the same pair of color temperature and color rendering index, changing to a second sight distance, and repeating S303;

S305: adjusting to the next pair of color temperature and color rendering index, and repeating S303 and S304; and S306: repeating S302 to S305 to obtain a relationship curve of static calibration states under the different color temperatures and/or the color rendering indexes as well as the different luminance levels.

Optionally, the step S101 further comprises pre-verifying the preset color temperatures and color rendering indexes based on the relationship curve of the static calibration state.

Furthermore, in some embodiments of the present invention, provided is an installation method of roadway low-position lighting fixtures, comprising:

c) selecting a plurality of low-position lighting fixtures determined by the measuring method according to any embodiment of the present invention.

d) installing the plurality of low-position lighting fixtures along both sides of a road.

In a further embodiment, the installing the plurality of low-position lighting fixtures along both sides of a road, comprises:

installing double-beam barrier or three-beam barrier along both sides of the road; and arranging the plurality of low-position lighting fixtures at intervals in a groove of the double-beam barrier or in an upper groove of the three-beam barrier in a road direction.

As shown in FIG. 5, a low-position lighting fixture 510 is installed in a groove of a double-beam barrier 520.

As shown in FIG. 6, a low-position lighting fixture 610 is installed in an upper groove of a three-beam barrier 620.

Although not shown herein, in some embodiments low-position lighting fixtures may be installed on an inside of concrete barriers.

Preferably, the installation height of the low-position lighting fixtures is in the range of 55 to 85 cm; preferably, and more preferably the installation height of the low-position lighting fixtures is 60 cm or 80 cm.

More preferably, for the double-beam barrier, the installation height of the low-position lighting fixtures is 60 cm.

More preferably, for the three-beam barrier, the installation height of the low-position lighting fixtures is 80 cm.

As shown in FIG. 7 and FIG. 8, in some embodiments, the installing the plurality of low-position lighting fixtures along both sides of a road, comprises:

installing the plurality of low-position lighting fixtures to illuminate in a vehicle traveling direction in a manner that a peak line of light source is coincident with a center line of a driving lane of the road.

In some embodiments, the illumination angles of the low-position lighting fixtures on the left and right side are different, with the illumination angle on the left side greater than the illumination angle on the right side (in a horizontal direction and/or a longitudinal direction).

Preferably, as shown in FIG. 7, a horizontal projection angle of the low-position lighting fixtures on a left side of the road is in a range of 40° to 45°, preferably 42.15°, and a vertical projection angle is in a range of 26°~31°, preferably 28.54°; as shown in FIG. 8, a horizontal projection angle of the low-position lighting fixtures on a right side of the road is in a range of is 26°~31°, preferably 28.54°, and a vertical projection angle is in a range of 27°~32°, preferably 29.24°.

In some embodiments, the installing the plurality of low-position lighting fixtures along both sides of a road, comprises:

for a straight-line section of the road, installing the plurality of low-position lighting fixtures at a fixed installation height in a vehicle traveling direction; and for a slope section of the road, installing the plurality of low-position lighting fixtures with gradually changing installation heights.

In some embodiments, provided is a road, comprising a plurality of low-position lighting fixtures installed by the installation method of roadway low-position lighting fixtures according to any embodiment of the present invention.

Various exemplary examples are described below for implementing the embodiments of the invention. The features of the various examples can be combined with the embodiments of the invention to obtain new inventions.

EXAMPLE 1 STATIC VISUAL RECOGNITION OF LIGHT SOURCE CHARACTERISTIC INDICATORS

In an example, the following experiment is carried out to determine the impact of the color temperature, color rendering index and luminance of the low-position illumination lamp on the driver's visual recognition:

1. Brief Description of Experiment

An experiment is conducted to test driver visibility of a target under different lighting environments created by using different color temperatures, color rendering indices and light intensities.

In the example, the road luminance data required by the drivers to visually recognize the target at different safe stopping sight distance are collected under different color temperatures and certain color rendering indexes. The drivers' luminance requirements for target identification under different light source color temperature conditions are analyzed, the target recognition under different light source color temperature conditions is studied, and the influence of low lighting on driving visual recognition is analyzed. It is conceivable that the experiments of the described embodiment can be repeated under other color rendering indexes.

2. Subjects

According to the purpose of the experiment, 12 healthy drivers are selected for the static visual recognition experiment by means of a field random sampling method. The drivers are required to be free of alcohol or drugs, rest well and react normally before the experiment. Their binocular uncorrected visual acuity is above 4.9 measured by the visual chart, and they have no color blindness, color weakness and other eye diseases. Because the drivers' eye heights of a passenger car are lower than those of a large truck, and thus their visions are lower, their visual recognition of the target is more difficult under the same light environment. In order to ensure the validity of the experimental data, based on a maximum unfavorable principle, a typical passenger car is selected as the experimental vehicle.

3. Selection of Experimental Parameters

In order to make the lighting source controllable and facilitate the experimental operation, the LED light source commonly used for road lighting is selected as the experimental light source. In order to improve the validity of the experimental data, the universality of coverage and the possibility of market production, this experiment selects 3000K, 4000K, 5000K and 5700K as the color temperature levels of the representative light source in the experiment. Combined with the lighting standards of road traffic, the luminance levels selected in this experiment are in a range of 0~5 cd/m². The experiment is carried out at the preset speeds of 60 km/h and 80 km/h, with corresponding stopping sight distances 75 m and 110 m, respectively.

4. Brief Description of Experimental Site

The experimental site is constructed according to a real half-width road of a bridge-tunnel connection section with a separated subgrade. The experimental road is 50 m long and 10 m wide, with two lanes, straight alignment, and cement concrete pavement. Wooden barrier is set on both sides of the road which is built according to the actual concrete barrier size 1:1.

5. Experimental Steps (1) The uniform light environment condition is built as required for the experiment to ensure that there are no dark spots on the road surface, and the target is placed randomly.

(2) The light source is adjusted to the preset color temperature level.

(3) The luminance value is adjusted from low to high, 12 drivers visually recognize the target at the same stopping sight distance from the target, and the comprehensive visual recognition results of the 12 drivers are recorded.

(4) At the same color temperature level, the stopping sight distance is changed and step (3) is repeated.

(5) The color temperature is adjusted to the next preset one, and steps (3) and (4) are repeated.

(6) Steps (2) to (5) are repeated until the end of the experiment.

6. Relationship Curve of Static Calibration State

The experimental data are sorted and analyzed with the invalid samples removed, and finally a total of 240 groups of valid experimental samples are obtained for the visual recognition results of drivers under a bridge lighting at night. The luminance values with the same visual recognition result of the driver under the same color temperature and sight distance are averaged, and a total of 20 sets of valid data, are obtained. Through the sorting and analysis of the final valid data, the correlation between the color temperature and the luminance requirement under the same visual recognition result is obtained, as shown in FIG. 9.

Figure 9:
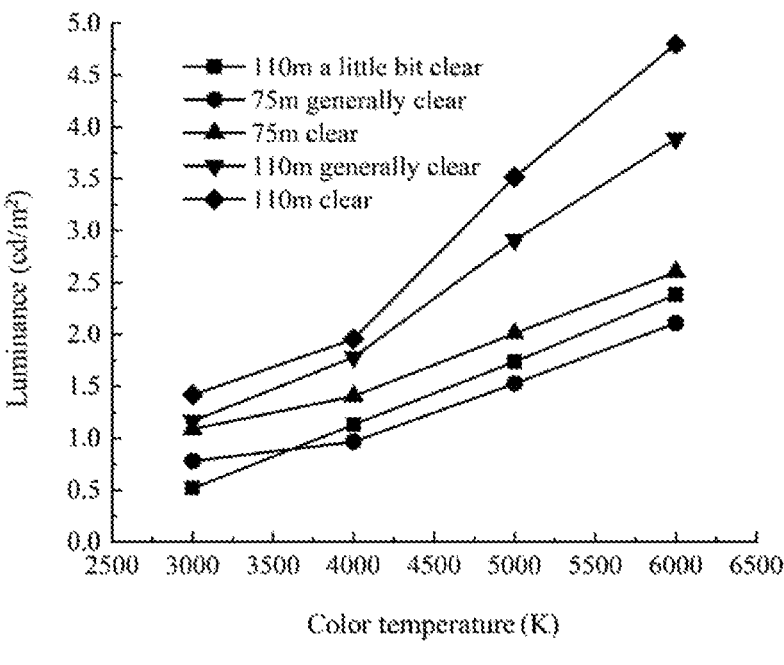
FIG. 9 is a correlation diagram between color temperature and luminance requirement according to an embodiment of the present invention.

Analysis of FIG. 9 shows that under the same conditions of the sight distance and visual recognition results, as the color temperature increases, the driver's luminance requirement to achieve the same visual recognition result increases. When the color temperature is within 3000~4000K, the required luminance level for visual recognition does not change much; when the color temperature is greater than 4000K, the required luminance level for visual recognition increases significantly.

In the example, the color rendering index is 70. However, after completion of the experiment of different color temperatures under the color rendering index of 70, the experiment may also be carried out under other color rendering indexes to obtain the corresponding relationship curve.

In the example, after the static visual recognition experiment is performed, it may pre-verify the color temperature and color rendering indexes and their relationship with luminance that may be used for dynamic visual recognition.

EXAMPLE 2 VISUAL RECOGNITION EXPERIMENT FOR LIGHT SOURCE CHARACTERISTIC INDICATORS

1. Brief Description of Experiment

In this embodiment, through dynamic experiments, the driver's visual recognition of a specific target is tested under the environmental conditions of bridge lighting with different light sources. The relationship model between the drivers' sight distance of the target on the bridge pavement and the pavement luminance at night is established under different operation speeds. In addition, the different designed speeds are substituted into the model to calculate the minimum luminance levels, i.e., the thresholds of luminance corresponding to the recognition distances under different stopping sight distances. The driver's demand thresholds of the luminance in the bridge section at night under different light source conditions are obtained. Combined with the static experimental conclusions, the optimal color temperature and color rendering index of the bridge low-position illumination lamp and the corresponding luminance demand threshold are finally obtained.

2. Subjects

At present, no mature theory has been proposed for the number of tested drivers in the visual cognition experiment domestically and abroad, and generally 4 to 8 drivers are used in the experiment. Six healthy and skilled drivers are randomly selected in this experiment.

3. Selection of Experimental Parameters

Considering the practicality, the adopted color rendering index of the light source is 70 in this experiment. According to the experimental conditions, four color temperature levels of 3000K, 4000K, 5000K and 6000K are selected for the color temperature. Considering the comprehensiveness and effectiveness of the pavement luminance values set in the experiment, the bridge pavement luminance levels are selected within 0~2.5 cd/m². The tested drivers drive at three speeds of 60 km/h, 80 km/h and 100 km/h, respectively, and recognize the target on the road during driving.

4. Brief Description to Experimental Site

This experiment is carried out under clear weather, good visibility and free flow conditions. The Gongboling No. 1 Bridge on the right line of the G310 Xunhua-Longwuxia Expressway in Qinghai Province is selected as the experimental section. The bridge is 165 m long and its alignment is a straight line. The bridge is connected with the exit of the Gushiqun Tunnel and the entrance of the Gongboling No. 1 Tunnel, respectively. The bridge is with asphalt concrete pavement, and concrete barrier.

5. Experimental Steps (1) The required luminance and uniform light environment conditions is built for the experiment to ensure that there are no dark spots on the road surface, and a target is placed randomly.

(2) The light source is adjusted to the preset color temperature, color rendering index and luminance level.

(3) The non-contact automotive speedometer is installed, and the tested driver and the experimental operator get on the vehicle, and then the driver puts on the eye-tracker.

(4) The driver drives the vehicle at a specific speed to visually recognize the target. According to the visual recognition situation, the experimenter uses a non-contact automotive speedometer to mark the position of the vehicle when the driver sees the target and the position when the vehicle passes the target.

(5) The luminance level is adjusted according to the visual recognition situation, and the step (4) is repeated until completion of the experiment of the driver with different lighting luminance levels at the specific speed and the color temperature of the light source.

(6) The light source is adjusted to the next set of specific color temperature and color rendering index, and the step (5) is repeated until completion of the driver's experiment under light environments of different light sources at this speed.

(7) The driver changes the running speed, and repeats steps (4) to (6) until completion of the experiment of the driver under different running speeds and light environments of different light source light environments, and after that, the driver is replaced by another one.

(8) Steps (3) to (7) are repeated until all the tested drivers complete the visual recognition experiment, and the experiment ends.

In this example, it may first set up a certain one of the color rendering indexes in step (6), and then adjust the color temperatures; but the sequence may also be reversed.

6. Fitting of Safe Sight Distances and Luminance Levels of Road Section and Determination of Demanded Threshold The experimental data are classified, sorted and analyzed. The experimental data of each tested driver are averaged, and the invalid samples are removed, and finally a total of 43 groups of valid experimental samples were obtained. The driver's average speed and average sight distance are used as characteristic values for analysis. By analyzing the data, it can be seen that when the luminance levels of the bridge road surface are within a certain range, the driver's sight distances to the target object are positively correlated with the road surface luminance levels. As the road luminance increases, the sight distance gradually increases; under the same luminance condition, as the color temperature increases, the sight distance gradually decreases.

According to the obtained multiple sets of sight distance D and the corresponding luminance L, the Sigmoid function model is used to calculate and fit the data of multiple sets of D and L, and the relationship model formula of D and L is obtained as follows.

① Type of artificial light source (color temperature, color rendering index) (3000K, 70)

$$D = \frac{265}{1 + e^{(-3.1L+0.2)}} - 95.2 \tag{1}$$

Model Applicability: $D \in [45.08, 184.41]$, $L \in [0.000, 1.490]$.

② Type of artificial light source (color temperature, color rendering index) (4000K, 70)

$$D = \frac{178}{1 + e^{(-4.0L+0.77)}} - 33.1 \tag{2}$$

Model Applicability: $D \in [74.94, 150.49]$, $L \in [0.000, 1.185]$.

③ Type of artificial light source type (color temperature, color rendering index) (5000K, 70)

$$D = \frac{262}{1 + e^{(-1.3L+0.27)}} - 93.7 \tag{3}$$

Model Applicability: $D \in [54.42, 165.17]$, $L \in [0.000, 2.552]$.

④ Type of artificial light source (color temperature, color rendering index) (6000K, 70)

$$D = \frac{294}{1 + e^{(-0.89L-0.12)}} - 141 \tag{4}$$

Model Applicability: $D \in [33.3, 136.3]$, $L \in [0.000, 2.695]$. where D is the sight distance, L is the road surface luminance of the bridge section.

According to the established relationship model of sight distance and luminance, the stopping sight distances of 75 m, 110 m and 160 m corresponding to the designed speeds of 60 km/h, 80 km/h and 100 km/h respectively are substituted into the model (1) to model (4) to obtain the luminance thresholds of the bridge-tunnel connection section under free flow conditions, under a certain color rendering index and light source conditions of different color temperatures, as shown in Table 1.

TABLE 1

| Luminance threshold of bridge section at night. | | | |
|---|---|---|---|
| Type of light source (color temperature (K), color rendering index) | Luminance thresholds (cd/m$^2$) for different design speeds | | |
| | 60 km/h | 80 km/h | 100 km/h |
| 3000 K, 70 | 0.253 | 0.462 | 1.116 |
| 4000 K, 70 | 0.301 | 0.545 | — |
| 5000 K, 70 | 0.663 | 1.170 | 2.838 |
| 6000 K, 70 | 1.279 | 2.117 | — |

In this example, only the luminance thresholds for a color rendering index of 70 at different color temperatures and different driving speeds are shown. However, after completion of the experiment of different color temperatures under the color rendering index of 70, the experiment can be carried out under other color rendering indices to obtain the corresponding relationship curve.

It should not be construed as a limitation that under the same luminance condition of road surface in the bridge-tunnel connection section at night, the lower the color temperature of the low-position lighting source of the bridge, the easier it is for the driver to identify targets.

In some embodiments, it may based on the fitted relationship model, determine at least one of the multiple sets of low-position illumination lamp or at least one pair of preset color temperature and color rendering index in the low-position illumination lamp set.

In some embodiments, such determination is also based on driver's safe visual requirements.

In some embodiments, the driver's safe visual recognition requirements may be detennined at least partly according to road lighting standards, e.g., national standards, such as requirements related to road lighting quality in Specification or highway lighting (GB/T 24969-2010), luminance should be greater than or equal to 2 cd/m$^2$. In some embodiments, the driver's safe visual recognition requirement may also be a standard that has a certain luminance margin beyond the condition that the above-mentioned national standard is met, for example, in a turning or dangerous area.

In some embodiments, the driver's safe visual requirements may also take into consideration the limiting speed.

In some embodiments, such determination is also based on the energy minimization principle.

In some embodiments, such determination is based on both driver's safe visual. requirements and energy minimization principles.

For example, for difkrent locations on the road or different roads, it may determine based on the speed limits, the low-position lighting fixtures or preset color temperature and color rendering index that may on one hand meet the driver's safe visual recognition requirements and on the other minimize the energy used for road lighting from the fitting curve.

Unless otherwise stated, the actions or steps of the methods, programs, and procedures described according to the embodiments of the present invention do not necessarily have to be performed in a specific order, and still can achieve the desired results. In some embodiments, multitasking and parallel processing are also possible or may be advantageous.

Herein, various embodiments of the present invention are described. However, for the sake of concise, the description of each embodiment is not exhaustive, and the same or similar features or parts among various embodiments may be omitted. As used herein, the meaning 'an embodiment', 'some embodiments', 'an example', 'a specific example', or 'some examples' are applicable in at least one embodiments or examples of the present invention, but not all embodiments. The above terms are not necessarily meant to refer to the same embodiment or example. Those skilled in the art may combine and assemble the different embodiments or examples as well as the features of the different embodiments or examples described in this specification, without conflicting each other.

Exemplary systems and methods of the present invention have been specifically shown and described with reference to the foregoing embodiments, which are merely examples of the preferable modes of implementation of the present systems and methods. It will be understood by those skilled in the art that various modifications can be made to the embodiments of the systems and methods described herein in implementing the present systems and/or methods without departing from the spirit and scope of the invention as defined in the appended claims.

The invention claimed is:

1. An installation method of roadway low-position lighting fixtures based on parameter measurement, comprising:

selecting a plurality of low-position lighting fixtures determined by

S101: providing a plurality of first sets of low-position lighting fixtures each set with a respective pair of preset color temperature and color rendering index, or a second set of low-position lighting fixtures configurable with multiple pairs of preset color temperature and color rendering index;

S102: for each set of the plurality of first sets of low-position lighting fixtures or each pair of preset color temperature and color rendering index in the second set of low-position lighting fixtures, performing a dynamic visual recognition test dynamically recognizing a target under different predetermined luminance levels at different predetermined operating speeds, including:

S201: building a light environment for dynamic visual recognition on a dynamic experimental road on which a first target is placed randomly;

S202: adjusting the low-position lighting fixtures to one of the predetermined luminance levels under the preset color temperature and color rendering index;

S203: installing a speed detection device on a test vehicle, and equipping putting on an eye-tracker on a tested driver after the tested driver and an experimental operator getting on the test vehicle;

S204: the tested driver driving the test vehicle at one of the predetermined operating speeds along the dynamic experimental road, wherein the eye-tracker records eye movement data of the tested driver to visually recognize the first target, and wherein the experimental operator, according to the visual recognition based on the recorded eye movement data indicating the tested driver's recognition of the first target, marks a first position of the test vehicle at a moment of recognition when the driver sees the first target and a second position of the test vehicle passing the first target, thereby obtaining to obtain a recognition distance between the first and second positions;

S205: adjusting to a further one of the luminance levels, and repeating S204 until completion of the dynamic visual recognition test of the driver under the different predetermined luminance levels at the operating speed under the preset color temperature and color rendering index;

S206: adjusting to the next pair of the preset color temperature and the color rendering index in the second set or changing to the next set of the first sets, and repeating S205 until completion of the dynamic visual recognition test of the driver at the operating speed in different lighting environments of the lighting fixtures;

S207: adjusting the test vehicle to the next operating speed, repeating S204 to S206 until completion of the dynamic visual recognition test of the driver under different predetermined luminance levels at the different predetermined operating speeds in the different lighting environments of the lighting fixtures, and changing to a next driver; and S208: repeating S203 to S207 until all the tested drivers completing the dynamic visual recognition test to obtain dynamic visual recognition samples each sample comprising the recognition distances and the luminance levels of the lighting fixtures;

S103: fitting, based on the obtained samples, a relationship model between recognition distance and luminance for determining a luminance threshold that satisfies a safe sight distance requirement for the roadway; and S104: based on the fitted relationship model, determining at least one set of said plurality of first sets of low-position lighting fixtures or determining at least one pair of preset color temperature and color rendering index for said second set of low-position lighting fixtures that meets the luminance threshold; and installing the plurality of low-position lighting fixtures along both sides of a road, wherein the plurality of low-position lighting fixtures comprise the at least one determined first set of low-position lighting fixtures, or are configured with the at least one pair of determined color temperature and color rendering index.

2. The installation method according to claim 1, wherein the installing the plurality of low-position lighting fixtures along both sides of a road, comprises: installing double-beam barrier or three-beam barrier along both sides of the road; and arranging the plurality of low-position lighting fixtures at intervals in a groove of the double-beam barrier or in an upper groove of the three-beam barrier in a road direction.

3. The installation method according to claim 2, wherein the installation height of the low-position lighting fixtures is in the range of 55 to 85 cm.

4. The installation method according to claim 2, wherein in a straight line section of the road, for the double-beam barrier, the installation height of the low-position lighting fixtures is 60 cm and for the three-beam barrier, the installation height of the low-position lighting fixtures is 80 cm.

5. The installation method according to claim 1, wherein the installing the plurality of low-position lighting fixtures along both sides of a road, comprises:

installing the plurality of low-position lighting fixtures to illuminate in a vehicle traveling direction in a manner that a light peak line of the lighting fixtures is substantially coincident with a center line of a driving lane of the road.

6. The installation method according to claim 1, wherein an horizontal projection angle of the low-position lighting fixtures on a left side of the road is in a range of 40° to 45°, and a vertical projection angle of the low-position lighting fixtures on the left side is in a range of 26°~31°.

7. The installation method according to claim 1, wherein a horizontal projection angle of the low-position lighting fixtures on a right side of the road is in a range of is 26°~31°, and a vertical projection angle of the low-position lighting fixtures on the right side is in a range of 27°~32°.

8. The installation method according to claim 1, wherein the installing the plurality of low-position lighting fixtures along both sides of a road, comprises:

for a straight-line section of the road, installing the plurality of low-position lighting fixtures at a fixed installation height.

9. The installation method according to claim 1, wherein the installing the plurality of low-position lighting fixtures along both sides of a road, comprises:

for a slope section of the road, installing the plurality of low-position lighting fixtures with gradually changing installation heights.

10. A road, comprising a plurality of low-position lighting fixtures installed by the steps of:

selecting a plurality of low-position lighting fixtures determined by:

S101: providing a plurality of first sets of low-position lighting fixtures each set with a respective pair of preset color temperature and color rendering index, or a second set of low-position lighting fixtures configurable with multiple pairs of preset color temperature and color rendering index;

S102: for each set of the plurality of first sets of low-position lighting fixtures or each pair of preset color temperature and color rendering index in the second set of low-position lighting fixtures, performing a dynamic visual recognition test dynamically recognizing a target under different predetermined luminance levels at different predetermined operating speeds, including:

S201: building a light environment for dynamic visual recognition on a dynamic experimental road on which a first target is placed randomly;

S202: adjusting the low-position lighting fixtures to one of the predetermined luminance levels under the preset color temperature and color rendering index;

S203: installing a speed detection device on a test vehicle, and equipping an eye-tracker on a tested driver after the tested driver and an experimental operator getting on the test vehicle;

S204: the tested driver driving the test vehicle at one of the predetermined operating speeds along the dynamic experimental road, wherein the eye-tracker records eye movement data of the tested driver to visually recognize the first target, and wherein the experimental operator, according to the visual recognition based on the recorded eye movement data indicating the tested driver's recognition of the first target, marks a first position of the test vehicle at a moment of recognition when the driver sees the first target and a second position of the test vehicle passing the first target, thereby obtaining to obtain a recognition distance between the first and second positions;

S205: adjusting to a further one of the luminance levels, and repeating S204 until completion of the dynamic visual recognition test of the driver under the different predetermined luminance levels at the operating speed under the preset color temperature and color rendering index;

S206: adjusting to the next pair of the preset color temperature and the color rendering index in the second set or changing to the next set of the first sets, and repeating S205 until completion of the dynamic visual recognition test of the driver at the operating speed in different lighting environments of the lighting fixtures;

S207: adjusting the test vehicle to the next operating speed, repeating S204 to S206 until completion of the dynamic experiment visual recognition test of the driver under different predetermined luminance levels at the different predetermined operating speeds in the different lighting environments of the lighting fixtures, and changing to a next driver; and S208: repeating S203 to S207 until all the tested drivers completing the dynamic visual recognition test to obtain dynamic visual recognition samples each sample comprising the recognition distances and the luminance levels of the lighting fixtures;

S103: fitting, based on the obtained samples, a relationship model between recognition distance and luminance for determining a luminance threshold that satisfies a safe sight distance requirement for the roadway; and S104: based on the fitted relationship model, determining at least one set of said plurality of first sets of low-position lighting fixtures or determining at least one pair of preset color temperature and color rendering index for said second set of low-position lighting fixtures that meets the luminance threshold; and installing the plurality of low-position lighting fixtures along both sides of a road, wherein the plurality of low-position lighting fixtures comprise the at least one determined first set of low-position lighting fixtures, or are configured with the at least one pair of determined color temperature and color rendering index.

11. The method according to claim 10, comprising:

S301: building a light environment for static visual recognition on a static experimental road on which a second target is placed randomly;

S302: adjusting the light source to have the preset color temperature and color rendering index;

S303: with the luminance levels being adjusted, from low to high or from high to low, multiple drivers visually recognizing the second target at a first sight distance from the second target, and recording static visual recognition results of the drivers;

S304: under the same pair of color temperature and color rendering index, changing to a second sight distance, and repeating S303;

S305: adjusting to the next pair of color temperature and color rendering index, and repeating S303 and S304; and S306: repeating S302 to S305 to obtain a relationship curve of static calibration states under the different color temperatures and/or the color rendering indexes as well as the different luminance levels.

12. The method according to claim 11, wherein the step S101 comprises: pre-verifying the preset color temperatures and color rendering indexes based on the relationship curve of the static calibration state.

13. The method according to claim 10, wherein the S103 comprises: for the sight distances and the respective luminance levels of the samples obtained under the same pair of color temperature and color rendering index, fitting the recognition distances and the respective luminance levels of the samples using a Sigmoid function model.

14. The method according to claim 10, wherein the S104 comprises: determining the at least one set of said plurality of first sets each having the pair of preset color temperature and color rendering index which meet driver's safe visual recognition requirements, or determining for said second set, the at least one pair of preset color temperature and color rendering index which meet driver's safe visual recognition requirements.

15. The method according to claim 10, wherein the S104 comprises:

S401: selecting multiple first sets of low-position lighting fixtures having the pairs of preset color temperatures and color rendering indexes which meet driver's safe visual recognition requirements, or selecting for said second set, multiple pairs of the preset color temperatures and color rendering indexes of the low-position lighting fixtures which meet the driver's safe visual recognition requirements;

S402: determining energy consumption of the selected first sets of low-position lighting fixtures or energy consumption of the second set of low-position lighting fixtures with the selected pairs of preset color temperatures and color rendering indexes under a road-installed state;

S403: determining the at least one first set with minimum energy consumption or the at least one pair of preset color temperature and color rendering index for the said second set with minimum energy consumption.

* * * * *